April 20, 1937.  G. L. CHAPEL  2,077,395
FOOD COOKING MACHINE
Filed May 21, 1936  2 Sheets-Sheet 1
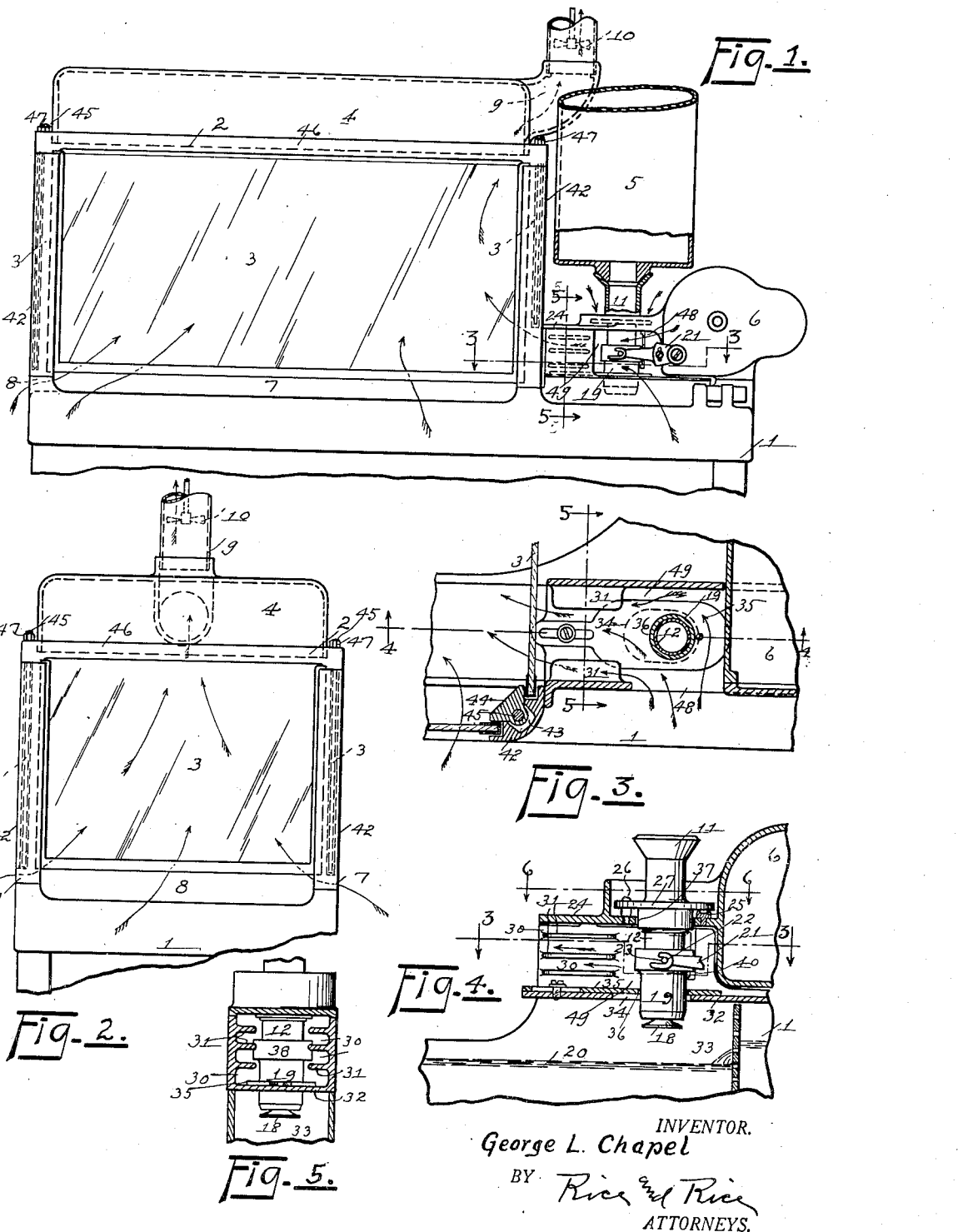
INVENTOR.
George L. Chapel
BY Rice and Rice
ATTORNEYS.

April 20, 1937.  G. L. CHAPEL  2,077,395
FOOD COOKING MACHINE
Filed May 21, 1936   2 Sheets-Sheet 2

INVENTOR.
George L Chapel
BY Rice and Rice
ATTORNEYS.

Patented Apr. 20, 1937

2,077,395

UNITED STATES PATENT OFFICE 2,077,395

FOOD COOKING MACHINE

George L. Chapel, Grand Rapids, Mich.

Application May 21, 1936, Serial No. 80,985

8 Claims. (Cl. 53—7)

The present invention relates to food cooking machines; and its object is, generally, to provide a machine for cooking doughnuts and the like, improved in certain respects hereinafter appearing; and particularly, to provide such a machine having mechanism for forming dough in doughnut shape with improved means for removably mounting certain parts of such mechanism; and further, to provide in such a machine means for cooling such mechanism and the dough therein; and further, to provide an improved casing in which the cooking is done.

These and any other and more specific objects hereinafter appearing are attained by, and the invention finds preferable embodiment in, the structure and mechanism particularly described in the body of this specification and illustrated by the accompanying drawings, in which:—

Figure 1 is an elevational front view of a machine for cooking doughnuts and the like, certain parts being shown in central vertical section;

Figure 2 is an elevational left hand end view thereof;

Figure 3 is a horizontal sectional view of parts of the machine taken on line 3—3 of Figures 1 and 4;

Figure 4 is a vertical sectional view of the same taken on line 4—4 of Figure 3;

Figure 5 is a vertical sectional view thereof taken on line 5—5 of Figures 1 and 3;

Figure 7:
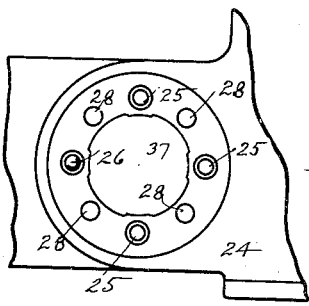
Figure 7 is a top plan view of some of said parts.
Figure 6:
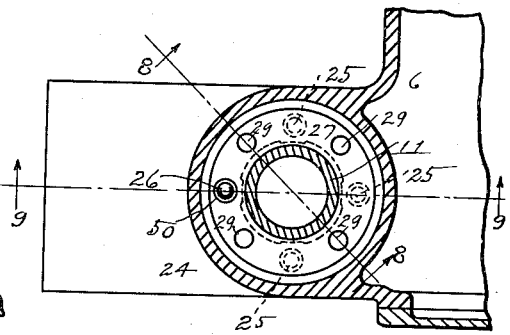
Figure 6 is a horizontal sectional view of certain parts taken on line 6—6 of Figure 4.
Figure 8:
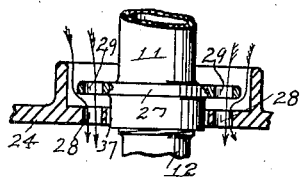
Figure 8 is a vertical sectional view of some of the parts taken on line 8—8 of Figure 6.
Figure 9:
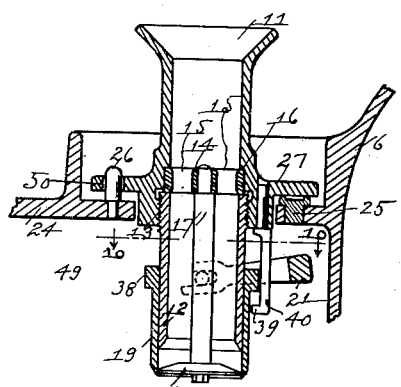
Figure 9 is a vertical central sectional view thereof taken on line 9—9 of Figure 6.

The base 1 of the cooking machine illustrated by these drawings carries a casing 2 with glazed sides 3 and a top hood or cap 4, and has a container 5 for the dough mass, mechanism for forming portions thereof in doughnut form, and means for driving said mechanism with a case 6 for an electric motor and gears.

Means for circulating air through the casing 2 in which the doughnuts are cooked to carry away the cooking fumes, etc. are provided including air inlets 7, 8 at the bottom of the casing's side and end walls, an exhaust passage 9 from the hood 4 and a rotary fan or exhaust pump indicated at 10. Air for cooling the doughnut-forming mechanism and the dough therein is also circulated around said mechanism and through the casing 2 and drawn out of the exhaust passage 9 as hereinafter more fully explained.

The detachable cylindrical discharge spout 11 of the container 5 has a downward extension 12 threaded at 13 thereinto, a spider 14 with openings 15 for the passage of dough therethrough being held between the upper end of said extension and the shoulder 16 of the main portion 11 of said discharge spout. A rod 17 is mounted centrally of said spider and carries at its lower end a disk 18. A sleeve 19 turnably and slidably surrounds said extension 12 and is slid therealong upwardly to permit a portion of the dough mass to pass out between the peripheral edge of the disk and the bottom edge of said extension, and then slid downwardly to separate said portion sufficient to make a doughnut and to form the same in doughnut shape.

The raw doughnut thus formed falls into the moving cooking liquid 20 and is floated thereby into the casing 2 wherein it is cooked by suitable heating means, not shown. The sleeve 19 is slid by suitable power as a motor in the case 6 geared to operate a lever arm 21 having in its bifurcated free end slots 22 in which the sleeve's opposite lugs or trunnions 23 are engaged. The discharge spout, i. e., its upper main portion 11, is supported spacedly from the upper wall 24 of the chamber 49 by heat-insulating pins or short posts 25 of fabric or the like and extends downwardly through said wall 24, a pin 26 extending through a hole 50 in the spout's flange 27 to removably hold the same in position.

Openings 28, 29 through said wall 24 and through said flange 27, and the door 48, admit air into the chamber 49 or space below said platform, and around said spout and its said extension, to cool the same and the dough therein, the air passing out through passages 30 between the vertically spaced horizontal plates 31 and into the casing 2 to be drawn out through the exhaust 9. The top wall 32 of the vessel or channel 33 for the cooking liquid has an elongated opening 34 through which the spout's sleeve 19 extends, this opening being closed to shut off heat from the liquid by the plate 35 slidable on said wall and having an opening 36 through which said sleeve extends and in which it fits sufficiently closely to shut off heat rising from the liquid but loosely enough to permit the following movement of the parts for the following purpose.

Figure 12:
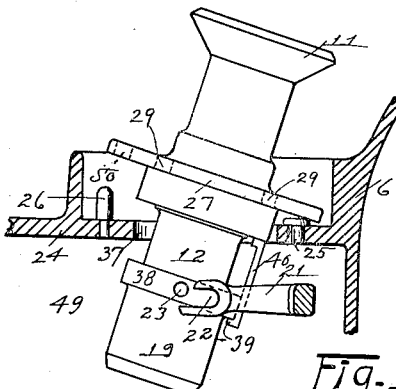
Figure 12 is an elevational view of some of these parts in another position, other parts being shown in vertical central section taken on line 9—9 of Figure 6.
Figure 10:
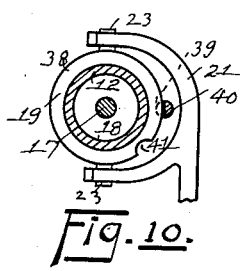
Figure 10 is a top plan view of such parts, other parts being shown in horizontal section taken on line 10—10 of Figure 9.
Figure 11:
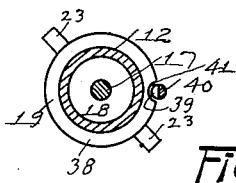
Figure 11 is a like view thereof in another turned position.

In the machine's operation the sleeve 19 is supported by its trunnions 23 engaging in the slots 22 of arm 21. To remove the sleeve when it is desired to clean the parts, the spout is tilted to the position shown in Figure 12 thus withdrawing the trunnions from the slots, the opening 37 through which the spout extends and the opening 34 through which the sleeve extends being sufficiently wide to permit such tilting. The sleeve is then supported by its annular rib 38 resting on the inwardly turned end or shelf 39 of the rod 40 mounted on the spout and is thereby prevented from falling into the cooking liquid. The sleeve may then be turned to the position seen in Figure 11 wherein the gap 41 in said rib registers with said end 39 whereupon the sleeve may be slid downwardly and disengaged from the spout.

The casing 2, in the illustrated construction, has vertical corner posts 42 grooved at 43 to receive vertical members 44 through which extend retaining bolts 45 extending upwardly from the base and through the rectangular top rim 46 and threaded for nuts 47 engaging said rim. The vertical edges of the glass sides and ends of the casing are held between said posts and the members 44.

The invention being intended to be pointed out in the claims, is not to be limited to or by details of construction and arrangement of the particular embodiment thereof illustrated by the drawings or hereinbefore described.

I claim:

1. In a cooking machine of the class described mechanism for separating a portion of the food to be cooked from a mass thereof, comprising: a pair of cooperating cutting elements mounted for axially tilting movement from operative position, having an operative relative movement axially and a relatively turnable movement about their axis, one of said elements having a shelf portion and the other element having a trunnion and a rib portion; a driving member having a slot in which the trunnion is engaged for operating the second-mentioned element and from which the trunnion is withdrawn by the tilting of the elements from operative position, the rib being adapted to be engaged by the shelf portion to support the second-mentioned element in the withdrawn position of the trunnion and in one turned position of said element and to be disengaged from the shelf portion in another turned position of the second-mentioned element.

2. In a machine for cooking doughnuts and the like: a pair of telescoping relatively turnable elements through which the dough passes having cooperating dough-separating and doughnut-forming parts, one of said elements being mounted for axially tilting movement from operative position and having a shelf portion, the other element having a trunnion and a rib supported on the shelf portion in one turned and axially moved position of said other element and released therefrom in another turned position thereof; a swingable driving arm releasably engaging the trunnion for operatively moving said other element axially and disengaging the trunnion by said tilting movement to permit separation of said elements.

3. In a machine for cooking doughnuts and the like: a pair of telescoping relatively turnable elements through which the dough passes having cooperating dough-separating and doughnut-forming parts, one of said elements having a shelf portion, the other element having a rib supported on the shelf portion in one turned and axially moved position of said other element and released therefrom in another turned position thereof to permit separation of said elements; means for operatively moving said elements relatively and axially.

4. In a machine for cooking food in a cooking liquid: a vessel adapted to contain the liquid; a chamber above and partitioned from said vessel; a spout through which the dough passes, extending through the chamber and discharging into the vessel; means for separating a portion of the food in the spout from the mass thereof and discharging the same from the spout; means for circulating air through the chamber and about the spout for cooling the dough therein.

5. In a machine for cooking doughnuts and the like in a cooking liquid: a vessel adapted to contain the liquid and having a top wall with an elongated opening therethrough; a chamber above said wall; a slidable closure for said opening having an opening therethrough; a spout through which the dough passes, extending through the chamber and closely through the closure's opening and discharging into the vessel, the spout being mounted for lateral movement; means for separating a portion of the dough in the spout from the mass thereof and discharging the same in doughnut shape from the spout; means for circulating air through the chamber and about the spout for cooling the dough therein.

6. In a machine for cooking doughnuts and the like in a cooking liquid: a vessel adapted to contain the liquid; a chamber above and partitioned from the vessel having an upper wall with an opening therethrough and upwardly extending posts of heat-insulating material; a spout through which the dough passes extending through said opening and through the chamber, discharging into the vessel and resting on the posts spacedly from said wall; means for separating a portion of the dough in the spout from the mass thereof and discharging the same in doughnut shape from the spout; means for circulating air through the chamber and about the spout for cooling the dough therein.

7. In a machine for cooking doughnuts and the like in a cooking liquid: a vessel adapted to contain the liquid; a chamber above and partitioned from the vessel having an upper wall with an opening therethrough and air passages at the side of said opening; a spout through which the dough passes extending through said opening and through the chamber discharging into the vessel and having a radial flange supported by said wall the flange having air passages therethrough; means for separating a portion of the dough in the spout from the mass thereof and discharging the same in doughnut shape from the spout; means for circulating air through said air passages and through the chamber and about the spout for cooling the dough therein.

8. In a machine for cooking food, a casing in which the food is cooked comprising a bottom, a top, vertical sides and vertical corner posts having vertical grooves in their inner sides, vertical members in the grooves and vertical retaining bolts extending through said members and fastened at their ends to the bottom and the top, each of said posts and said member connected therewith forming vertical recesses between them receiving the vertical edge portions of an adjacent pair of angularly disposed sides respectively.

GEORGE L. CHAPEL.